United States Patent
Inoue

(10) Patent No.: US 8,412,902 B2
(45) Date of Patent: Apr. 2, 2013

(54) SIGNAL PROCESSOR AND SIGNAL PROCESSING SYSTEM

(75) Inventor: Kazutoshi Inoue, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 376 days.

(21) Appl. No.: 12/645,001

(22) Filed: Dec. 22, 2009

(65) Prior Publication Data

US 2010/0169600 A1 Jul. 1, 2010

(30) Foreign Application Priority Data

Dec. 25, 2008 (JP) ................. 2008-330412

(51) Int. Cl.
*G06F 12/00* (2006.01)
*G06F 13/00* (2006.01)
*G06F 13/28* (2006.01)
*G06F 3/00* (2006.01)
*G06F 5/00* (2006.01)

(52) U.S. Cl. ............. 711/163; 711/154; 710/35; 710/39
(58) Field of Classification Search ............... 711/154, 711/163; 710/35, 39
See application file for complete search history.

(56) References Cited

U.S. PATENT DOCUMENTS 5,944,775 A * 8/1999 Satoshi .................. 708/603
7,143,212 B1 * 11/2006 Pai et al. ................. 710/58

FOREIGN PATENT DOCUMENTS

| JP | 2-292655 | 12/1990 |
|----|----------|---------|
| JP | 11-110222 | 4/1999 |
| JP | 2003-108991 | 4/2003 |
| JP | 2005-25599 | 1/2005 |

OTHER PUBLICATIONS

Foreign document 2003-108991 submitted by Applicant with english translation of application from http://www.ipdl.inpit.go.jp/homepg_e.ipdl under heading Patent&Utility model, sub-heading PAJ where the application can be looked up and reviewed in english.*
JPO action in counterpart application.

* cited by examiner

*Primary Examiner* — Michael Alsip
(74) *Attorney, Agent, or Firm* — Taft Stettinius & Hollister LLP

(57) ABSTRACT

In a signal processor including storage sections, a start address for starting output of data from an external memory, is input from an external controller to the start address input section. The signal output section outputs a start signal based on a download start instruction from the external controller, and outputs an end signal when download is completed. The output instruction section outputs, based on the start signal, to the external memory a data output instruction of download data for a designated storage section, starting from the start address, and stops output of the data output instruction based on the end signal. The write instruction section outputs a write instruction to the storage sections that allows data writing only to the designated storage section, and the download data is written to the designated storage section when the start signal is input to the output instruction section.

6 Claims, 11 Drawing Sheets

FIG.6

| START ADDRESS | 0001 |
|---|---|

FIG.7

| FUNCTIONAL BLOCK NO. | MASK SETTING | DATA BYTES |
|---|---|---|
| 1 | 1 | 4 |
| 2 | 0 | 6 |
| 3 | 1 | 5 |

FIG.12

|  | START ADDRESS |
|---|---|
| FUNCTIONAL BLOCK 1 | 0001 |
| FUNCTIONAL BLOCK 2 | 0005 |
| FUNCTIONAL BLOCK 3 | 0011 |

SIGNAL PROCESSOR AND SIGNAL PROCESSING SYSTEM

CROSS-REFERENCE TO RELATED APPLICATIONS

This application is based on and claims priority under 35 U.S.C. §119 from Japanese Patent Application No. 2008-330412 filed on Dec. 25, 2008, the disclosure of which is incorporated by reference herein.

RELATED ART

1. Field of the Disclosure

The disclosure relates to a signal processor that performs signal processing based on data downloaded automatically from a memory, and to a signal processing system of the same.

2. Description of the Related Art

There are signal processors and signal processing systems of LSI's or the like, generally having no CPU installed as a controller internally, and executing hard wired processing in a processing section under control of an external CPU, based on downloaded setting data with initial values and the like (wired logic processing that is a method of command processing using a direct logic circuit, and which is not a software processing with a micro-program).

In such signal processors (LSI's), when setting data and the like is set in an internal register and table memory, a CPU provided externally to the LSI, executes write processing that writes data downloaded sequentially to the internal registers and table memories that are the targets for setting, via a peripheral device with an external IA parallel bus, or a serial bus, such as an Inter Integrated Circuit ($I^2C$) or Serial Peripheral Interface (SPI).

For reducing the processing burden on an external CPU due to the write processing, there is a technique for writing data while automatically incrementing an address (for example, see Japanese Patent Application Laid-Open (JP-A) No. 02-292655).

In the technique described in JP-A No. 02-292655, for example, when there are a large number of internal registers and table memories as the download destinations for setting data, due to the external CPU executing setting of the internal registers and table memories, the processing burden on the external CPU becomes large with hogging of time and program memory space therein for setting, with this sometimes impeding other processing that the external CPU should be executing. Further, when the setting data is stored in the external CPU, the proportion accounted for by such data in the external CPU may be large. The performance of the overall system is reduced in such cases.

In a technique described in JP-A No. 2003-108991, control data (setting data) for substantially all internal registers corresponding to each video processing mode is held on an external ROM, and this control data is then stored in the internal registers based on processing commands to a processor from the external CPU.

However, the technique described in JP-A No. 2003-108991 simply stores the setting data being held on the external ROM for substantially all the internal registers, into the internal registers. Therefore, for example, if there are settings that are not changed for the processing of the processing command from the external CPU, and the setting data that is already stored in the internal registers could be used, this data is re-downloaded along with the other setting data even when there actually is no need to download this data. Namely, even setting data not needed to be downloaded is downloaded. Since time is required for downloading the unnecessary setting data, download time is taken up.

INTRODUCTION TO THE INVENTION

The present disclosure takes into consideration the above issues, and hence provides a signal processor and a signal processing system that can reduce the processing burden on a CPU, as well as being able to download data at high speed.

A first aspect of the present disclosure is a signal processor including: plural storage sections; a start address input section to which a start address is input from an external controller, the start address indicating an address for starting output of data from an external memory that stores a set of data to be downloaded to the plural storage sections; a signal output section adapted to output a start signal based on a download start instruction input from the external controller, and to output an end signal when download has been completed of data to be downloaded to at least one storage section designated by the external controller; an output instruction section that: (A) when the start signal is input thereto, is adapted to output to the external memory a data output instruction to output data corresponding to bytes of the data to be downloaded to the at least one designated storage section, starting from the start address, and (B) when the end signal is input thereto, is adapted to stop output of the data output instruction; and a write instruction section that is adapted to output a write instruction to the plural storage sections such that writing of data is prohibited to the plural storage sections other than the at least one designated storage section, and such that the data to be downloaded is written to the at least one designated storage section when the start signal is input to the output instruction section.

In the signal processor of the present aspect, when setting of the start address, and designation of the storage section to which data is to be download, are performed by the external CPU, in response to input of a download start instruction, data is downloaded only to the designated storage section. Consequently, the external CPU can be prevented from taking time and program execution capability for downloading data, and the download amount can be reduced. Thus the processing burden on the external CPU can be reduced, and data can be downloaded at high speed.

In the present aspect, the start address input section, the signal output section, the output instruction section and the write instruction section may be formed on an integrated circuit board.

In the present aspect the output instruction section may be adapted to output to the signal output section a data output instruction end signal indicating that the data output instruction, related to the bytes of the data to be downloaded to the at least one designated storage section, has been output to the external memory, and wherein the signal output section may be adapted to output the end signal based on the data output instruction end signal.

In the present aspect, in the external memory, the data to be downloaded to the at least one designated storage section may be stored in sequence starting from the start address, and the data output instruction output by the output instruction section may indicate that the external memory is to output, starting from the start address, a total number of bytes of data to be downloaded to the at least one designated storage section.

In the present aspect, the start address input section may be adapted to receive each respective start address of the set of data stored in the external memory; wherein the signal processor may further include a start address read-in controller that controls the output instruction section, such that each respective start address for the data to be downloaded to each respective designated storage section is read-in to the output instruction section from the start address input section; and wherein the data output instruction output by the output instruction section may indicate that the external memory is to output, in units of bytes, data to be downloaded to each respective designated storage section, starting from the start address of the data.

Another aspect of the present disclosure is a signal processing system including: a memory that stores a set of data to be downloaded to plural storage sections of the first aspect; a controller adapted to output a start address that indicates where to start output of data stored in the memory, a designation of at least one storage section that is a download destination of the data, and a download start instruction; and the signal processor of the first aspect, wherein the signal processor is adapted to write the data stored in the memory to the at least one designated storage section, based on the start address, the designation of the at least one storage section, and the download start instruction, which are output by the controller.

BRIEF DESCRIPTION OF THE DRAWINGS

Exemplary embodiments of the present disclosure will be described in detail based on the following figures, wherein:

FIG. 6 is a diagram explaining an example of a start address setting of an external memory download start address setting section according to the first exemplary embodiment;

FIG. 7 is a diagram explaining a specific example of a mask setting of a download destination register/table memory specification controller according to the first exemplary embodiment;

FIG. 12 is a diagram explaining an example of setting of the start address of an external memory download start address setting section according to the second exemplary embodiment.

DETAILED DESCRIPTION

The exemplary embodiments of the present disclosure are described and illustrated below to encompass a signal processor that performs signal processing based on data downloaded automatically from a memory, and to a signal processing system of the same. Of course, it will be apparent to those of ordinary skill in the art that the preferred embodiments discussed below are exemplary in nature and may be reconfigured without departing from the scope and spirit of the present disclosure. However, for clarity and precision, the exemplary embodiments as discussed below may include optional steps, methods, and features that one of ordinary skill should recognize as not being a requisite to fall within the scope of the present disclosure. Hereinafter, an exemplary embodiment of the present disclosure will be described in detail with reference to the drawings.

First Exemplary Embodiment

Figure 1:
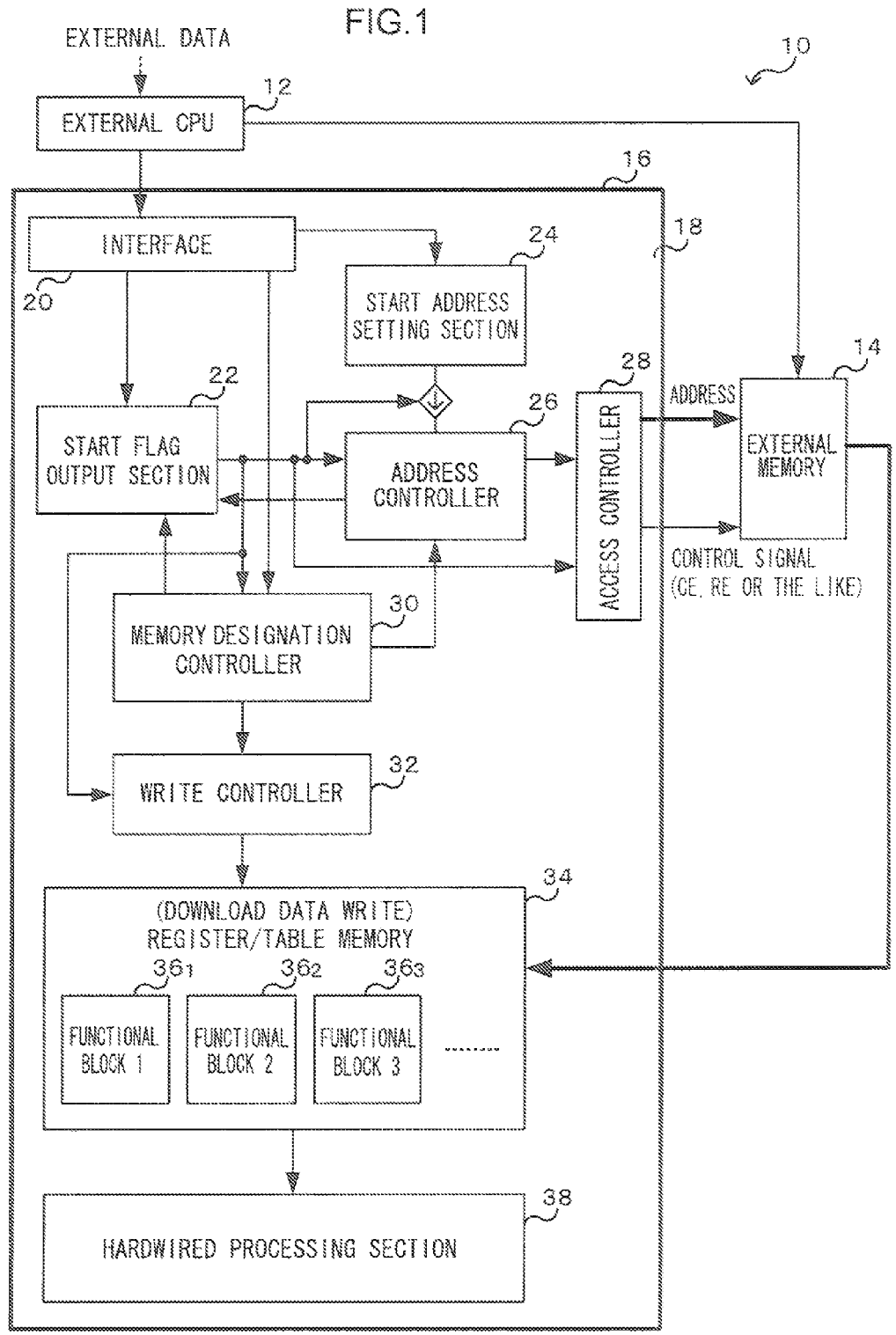
FIG. 1 is a functional block diagram showing an example of a schematic configuration of a signal processing system according to a first exemplary embodiment.

A detailed explanation will now be given of a signal processing system of the first exemplary embodiment. FIG. 1 is a functional block diagram showing an example of a schematic configuration of a signal processing system of the first exemplary embodiment. A signal processor 16 of the present exemplary embodiment is an example of a signal processor that performs processing of image signals, sound signals, or the like in a hardwired processing section 38.

A signal processing system 10 of the exemplary embodiment includes an external CPU 12, an external memory 14, and the signal processor (LSI) 16.

The external CPU 12 includes memories such as a ROM, and/or a RAM (neither illustrated in the drawings), and overall control of the signal processing system 10 is performed by a control program, such as a signal processing program, stored in the ROM for example, based on input external data. In the exemplary embodiment the external CPU 12 corresponds to an external controller.

The external memory 14 stores, when signal processing, setting data (described in detail later) to be downloaded to functional blocks 36 of a register/table memory 34. A specific example of the external memory 14 includes a flash memory or the like.

The signal processor 16 includes: an interface 20; an automatic download start flag output section (start flag output section) 22; an external memory download start address setting section (start address setting section) 24; an external memory download address controller (address controller) 26; an external memory access timing controller (access controller) 28; a download destination register/table memory designation controller (memory designation controller) 30; a download data write timing controller (write controller) 32; a register/table memory 34; and a hardwired processing section 38.

The signal processor 16 of the exemplary embodiment is a Large Scale Integrated circuit (LSI) with each of the circuits of the interface 20, the start flag output section 22, the start address setting section 24, the address controller 26, the access controller 28, the memory designation controller 30, the write controller 32, the register/table memory 34 and the hardwired processing section 38 are formed on a semiconductor integrated circuit substrate 18.

In the exemplary embodiment, the start flag output section 22 corresponds to the signal output section, the start address setting section 24 corresponds to the start address input section, the address controller 26 and the access controller 28 correspond to an output instruction section, and the memory designation controller 30 and the write controller 32 correspond to the write instruction section.

The interface 20 interfaces between the external CPU 12 and the start flag output section 22, the start address setting section 24 and the memory designation controller 30 of the signal processor 16.

The address controller 26, the access controller 28, the memory designation controller 30, and the write controller 32 are connected to the start flag output section 22. The start flag output section 22 outputs an automatic download start flag (start flag "1") that is a start signal, based on a download start instruction of the external CPU 12, and when download is complete, the start flag output section 22 resets the automatic download start flag and outputs an end flag (end flag "0") that is an end signal.

In the start address setting section 24, a download start address (referred to below as start address) is set by the external CPU 12 from which output of data from the external memory 14 is started.

The address controller 26 is connected to the start address setting section 24 to load the start address therefrom. The address controller 26 controls the download address of the external memory 14 based on the mask setting (described in detail later) of the memory designation controller 30 such that given bytes of data to be downloaded from the start address is output. The address controller 26 also outputs a data output instruction end signal that notifies the start flag output section 22 the fact that the given bytes of download data has been output.

The access controller 28 determines an access time to the external memory 14 based on the start signal (automatic download start flag) that has been input from the start flag output section 22 and the control circuit of the address controller 26, accesses the external memory 14 at the determined access time, and outputs a control signal that is a data output instruction for causing setting data to be output from the external memory 14.

An instruction is input to the memory designation controller 30 by the external CPU 12 instructing (designating) which of the plural functional blocks 36 in the register/table memory 34 is one or more functional blocks 36 to which the downloaded setting data is to be written (i.e., one or more download target blocks), and mask setting is made to prevent writing of setting data to the functional blocks other than the one or more download target blocks.

The write controller 32 determines a write time to the register/table memory 34 based on the start signal (automatic download start flag) input from the start flag output section 22 and the memory designation controller 30, outputs a control signal, to the register/table memory 34, as a write instruction to write the setting data output from the external memory 14 at the determined timing.

The register/table memory 34 is provided with plural functional blocks 36, for each of functions used for performing signal processing in the hardwired processing section 38. Each of the functional blocks 36 includes a register/table memory that corresponds to a storage section. In FIG. 1 are illustrated, for explanatory purposes, a functional block 1 (functional block $36_1$), a functional block 2 (functional block $36_2$) and a functional block 3 (functional block $36_3$). Suffixes 1 to 3 are appended to the functional blocks 1 to 3 when discrimination is needed; however, when referred to in general they are simply referred to as functional blocks 36. Examples of the functional blocks 36 include a timer function, an image rendering data memory, an image display function, a sound output function, and the like. Setting data corresponding to each of the functional blocks is specified in advance, and the setting data is downloaded from the external memory 14 according to the processing to be performed in the hardwired processing section 38.

The hardwired processing section 38 is connected to the register/table memory 34, and executes hardwired processing (signal processing) based on the setting data of the register/table memory 34.

A detailed explanation will now be given of operation of the signal processing system 10 of the exemplary embodiment.

Figure 2:
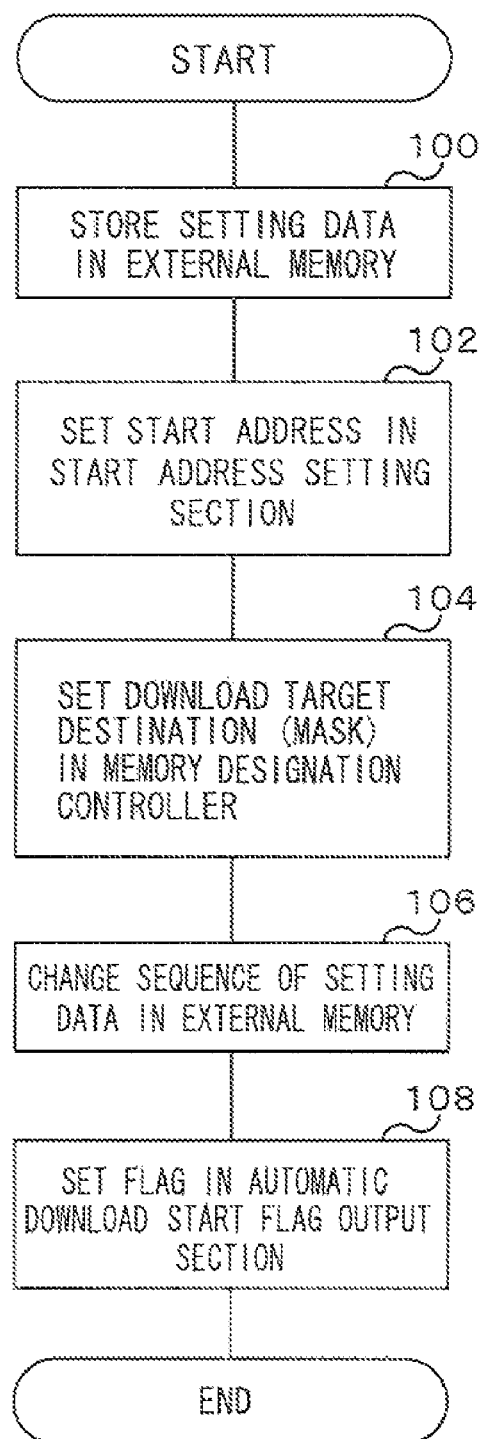
FIG. 2 is a flow chart showing an example of signal processing executed in an external CPU according to the first exemplary embodiment.

Explanation will first be given of the operation of the external CPU 12. FIG. 2 is a flow chart showing an example of signal processing executed in the external CPU 12.

Figure 3:
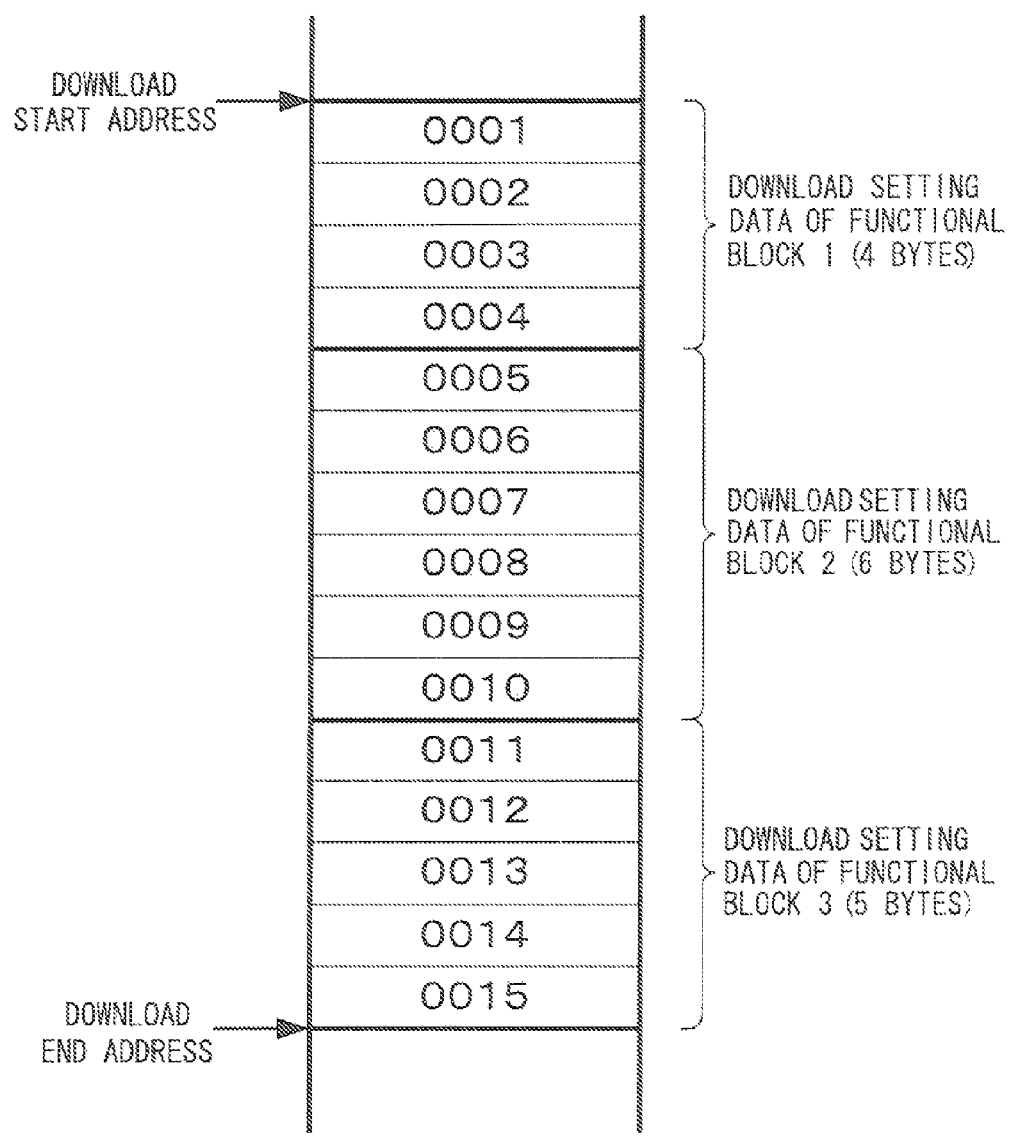
FIG. 3 is a diagram explaining an example of setting data stored in an external memory according to the first exemplary embodiment.

At step 100, a set of setting data to be downloaded to each of the functional blocks 36 of the register/table memory 34 is prepared and stored in the external memory 14. FIG. 3 shows an example of setting data stored in the external memory 14. Four bytes of setting data to be downloaded to functional block 1, six bytes of setting data to be downloaded to functional block 2, and five bytes of setting data to be downloading to functional block 3 are stored in sequence here, by one byte from the beginning address "0001".

When it is desired to download to each of the functional blocks 36 setting data of plural types of pattern, according to the usage environment, specific circumstances or the like, the addresses plural setting data are changed in accordance with the plural types of pattern, and stored in the external memory 14.

In the next step 102, the beginning address of the first setting data of the stored set of setting data is output to the start address setting section 24 and set as the start address. When the set of the setting data as shown in FIG. 3 is stored, the address "0001" is set as the download start address.

Step 100 (storing of the set of setting data in the external memory 14) and step 102 (setting of the start address) may be performed in advance.

At step 104, setting is made in the memory designation controller 30 of which functional blocks 36 it to be written in the setting data that has been downloaded from the external memory 14. Specifically, download target blocks which are designated to be written in the setting data, and non-download target blocks (a mask) which are prevented from writing of setting data. In the exemplary embodiment, explanation will be given below, as an example, of a case in which functional block 1 and functional block 3 are download target blocks, and functional block 2 is a non-download target block.

Figure 4:
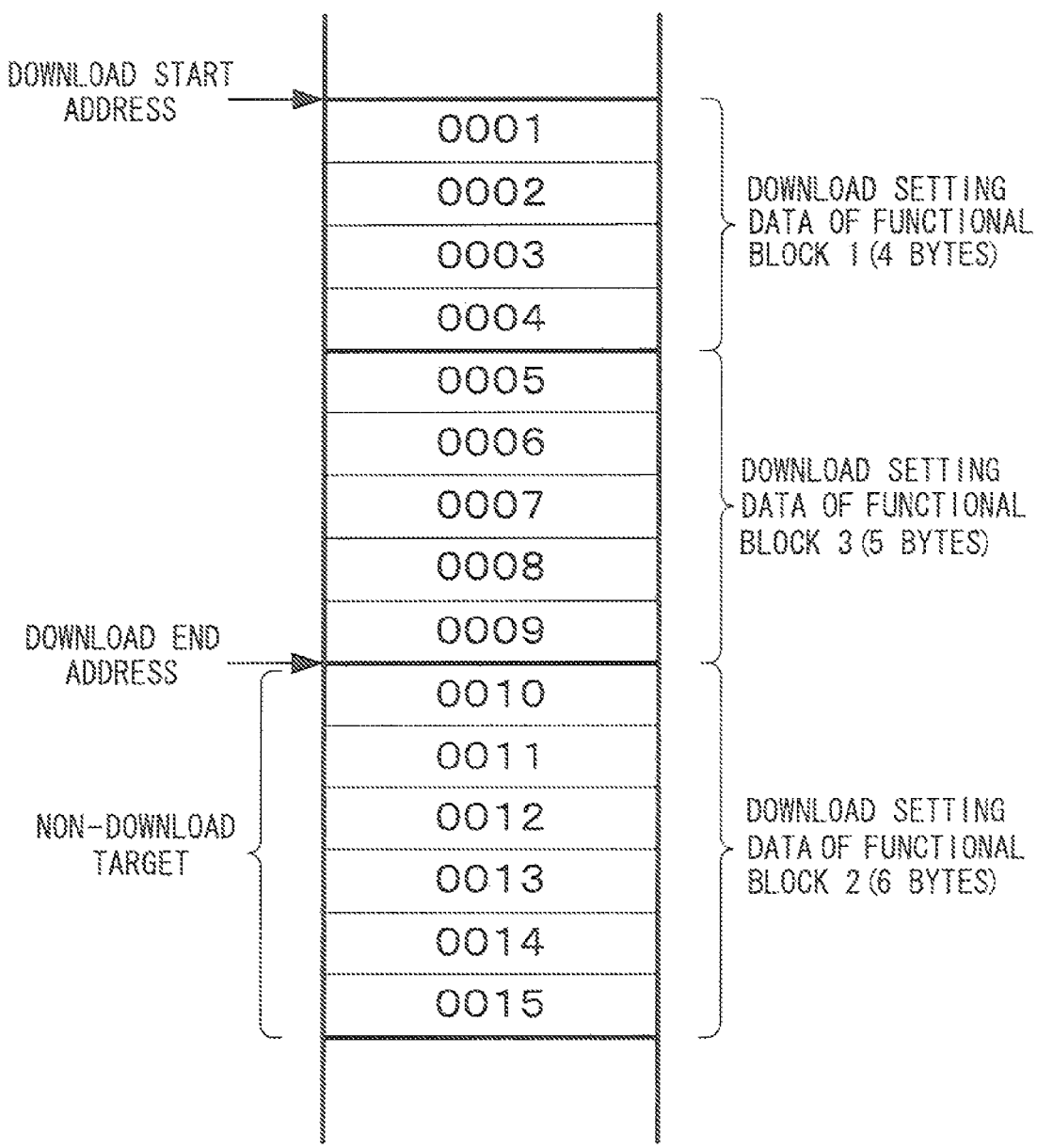
FIG. 4 is a diagram explaining changing the sequence of the setting data stored in the external memory according to the first exemplary embodiment.

At step 106, the sequence of the setting data stored in the external memory 14 is changed. In the exemplary embodiment, only the setting data of the download target blocks is stored from the beginning address in the sequence order of the download target blocks, and the setting data of the non-download target blocks is stored after all of the download target blocks have been stored. Namely, the setting data of the non-download target blocks is stored from the next address after the download complete address. An example of changing the sequence of the setting data is shown in FIG. 4. By changing the sequence here, the setting data for functional block 3 is stored after the setting data for the functional block 1, and the setting data for functional block 2 is stored at the next address "0010" after the download complete address "0009".

The processing of step 104 and the processing of step 106 may be omitted when all of the setting data stored in the external memory 14 is to be downloaded (when there are no non-download target blocks).

At step 108, in order to start execution of download to the LSI 16, a download start instruction is output to the start flag output section 22, and after setting the start flag "1", the current pressing routine is ended.

When it is desired to download plural types of pattern of setting data to the functional blocks 36 according the usage environment, specific circumstances or the like, the above steps 104 to 108 may be repeated such that corresponding setting data is downloaded to the corresponding functional blocks 36 based on the usage environment, specific circumstances or the like.

Figure 5:
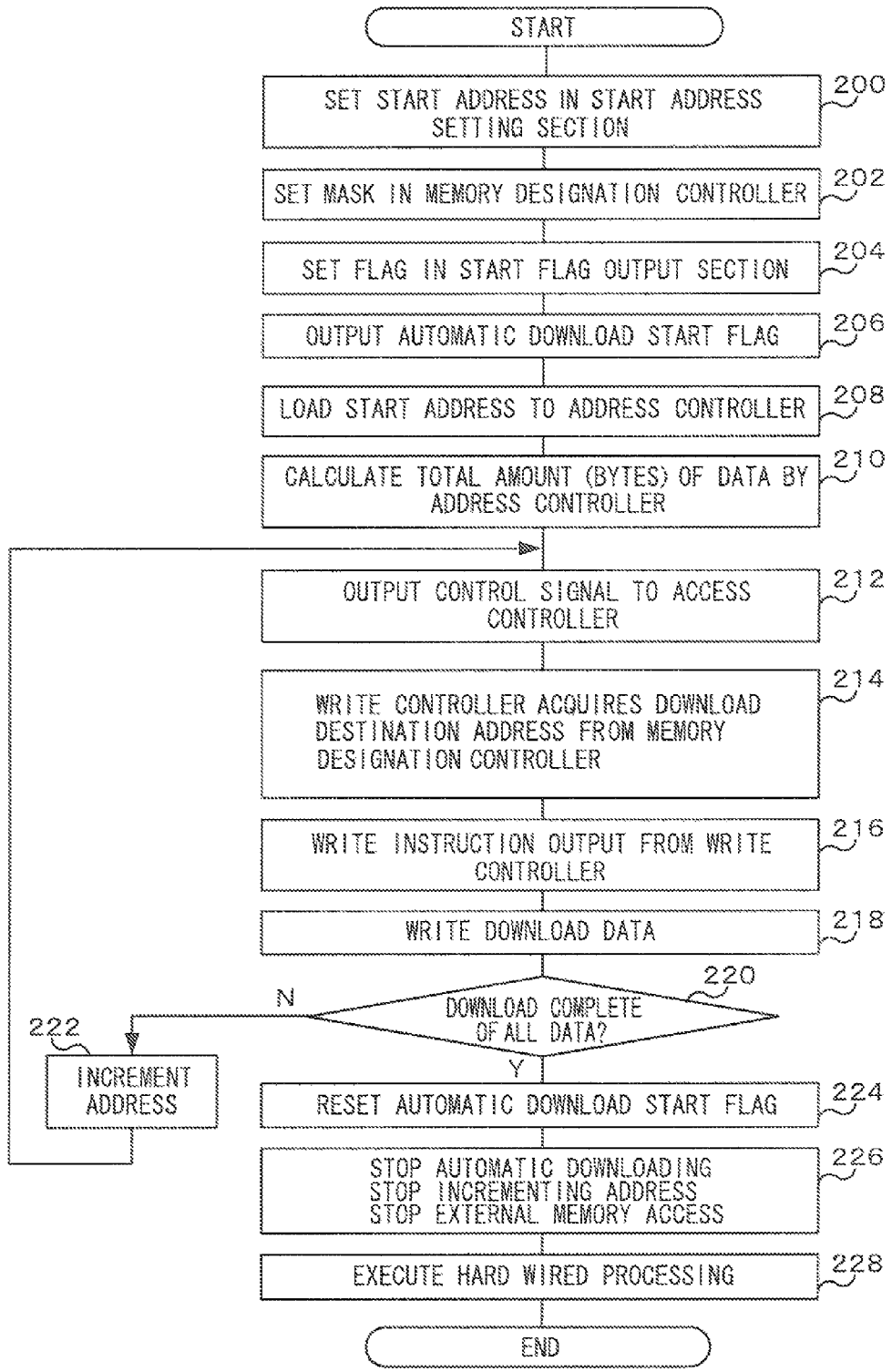
FIG. 5 is a flow chart showing an example of overall operational flow of an LSI (signal processor) according to the first exemplary embodiment.

Detailed explanation will now be given of overall operation of the LSI 16, which is the signal processor of the exemplary embodiment. FIG. 5 is a flow chart showing an example of the overall operation of the LSI 16.

At step 200, the beginning address from the external CPU 12 (processing of step 102) is input to the start address setting section 24 and is set as the start address. An example of this setting is shown in FIG. 6. The start address setting section 24 is, for example, a register, and is set with the start address "0001", as shown in FIG. 6.

In the next step 202, the download target blocks and the non-download target blocks (mask) are set in the memory designation controller 30 by the external CPU 12 (processing of step 104). Further, the number of bytes of the setting data for each of the functional blocks is input, and stored together with the mask setting. An example of the mask setting of the exemplary embodiment is shown in FIG. 7. In the exemplary embodiment, the mask setting of the download target blocks is "1", and the mask setting of the non-download target blocks is "0".

Explanation will now be given of an example of the download target blocks and the non-download target blocks. For example, when a display destination of an image being displayed or an output destination for sound, which are processed by hard wired processing, is changed, only the setting data of the image display functional block and the sound output functional block is need to be changed. Therefore, the image display functional block and the sound output functional block are set to be the download target blocks, setting data relating to the display destination or the output destination is downloaded, and the functional blocks 36 other than these are set to be the non-download target blocks. For example, when the color or the like of an image being displayed is changed, the image rendering functional block is set to be the download target block, setting data relating to image rendering, such as color table data, color data and the like, is downloaded, and the other functional blocks 36 are set to be the non-download target blocks. For example, when switching an image currently being displayed to an image representing different data, the functional blocks 36 required for displaying the switched image are set to be the download target blocks, the setting data to be changed are downloaded, and the other functional blocks 36 are set to be the non-download target blocks.

Namely, in the exemplary embodiment, only the changed setting data is downloaded to the corresponding functional blocks, and download of setting data that is not changed is prevented (prohibited).

In the exemplary embodiment, mask setting is performed for each of the functional blocks in the above manner. However, when there are plural set of setting data for a single functional block, mask setting may be performed for each set of the setting data as well as for each of the functional blocks.

In step 204, the download start instruction from the external CPU 12 (processing of step 108) is input to the start flag output section 22, and the start flag is set. In the exemplary embodiment, the start flag output section 22 is a register, and when the download start instruction is input, start flag "1" is set and outputted as a start signal, and automatic download is started. When download of all of the specified setting data is completed, the flag is set to end flag "0" and outputted as an end signal, and the download processing ends. Consequently, automatic download of the setting data is started from the present step 204.

In step 206, the start flag output section 22 outputs an automatic download start flag (flag "1") as the start signal.

In step 208, the start address that is set in the start address setting section 24 is loaded to the address controller 26.

In step 210, the address controller 26 calculates the total amount of data (bytes) for all of the setting data to be downloaded from the external memory 14, based on the mask setting of the memory designation controller 30 (FIG. 7). In the example shown in FIG. 7, 4 bytes+5 bytes=9 bytes is calculated as the total bytes of the data to be downloaded.

At step 212, a control signal, including the start address, a chip enable (CE) signal, and a read enable (RE) signal, is output as a data output instruction from the access controller 28 to the external memory 14, at an access time determined by the address controller 26.

The setting data to be downloaded from the external memory 14 is output to the register/table memory 34 based on this control signal.

In step 214, the write controller 32 acquires a write address for writing the download data of the download target blocks based on the mask setting of the memory designation controller 30.

In step 216, a write instruction that causes download data (setting data) that has been input from the external memory 14 to be written to the download target blocks is output from the write controller 32 at a determined write time.

At step 218, the corresponding setting data is written to specific addresses of the download target block due to the write instruction of step 216.

At step 220 determination is made as to whether or not download of all of the setting data is complete. In the automatic download of the exemplary embodiment, output of setting data is instructed to the external memory 14 while the address of output target is being incremented from the download start address in the address controller 26. Specifically, in the exemplary embodiment, the number of data bytes that has been downloaded is counted while incrementing the number, and determination is made that download of all of the setting data is complete when this count has reached the number of bytes calculated in step 210 (i.e., until when the control signal is outputted up to the calculated number of bytes). When the count has not yet been reached the calculated number of bytes, the routine proceeds to step 222, the address is incremented, the routine returns to step 212, and processing for outputting the control signal to the external memory 14 to cause the data stored at the incremented address to be output, and processing for writing the setting data output from the external memory 14 to the address of the corresponding functional block, is repeated. However, when the count has been reached the calculated number of bytes (9 bytes in the present example), the routine proceeds to step 224, a data output end signal is output, and the flag of the start flag output section 22 is reset. An end flag "0" that is the end signal is thereby output from the start flag output section 22.

Due to this, automatic download is stopped in step 226 based on the end signal that has been output from the start flag output section 22. The controller 26 stops to increment the address when the end signal is inputted. The access controller 28 also stops access to the external memory 14n, and stops the output of the control signal that is the data output instruction.

By such processing, in the exemplary embodiment, 4 bytes of setting data has been written to the functional block 1 in the register/table memory 34, and 5 bytes of setting data has been written to the functional block 3.

In step 228, hard wired processing is executed in the hardwired processing section 38 using the functional blocks 36 of the register/table memory 34, and after an image signal or a sound signal has been processed, the signal processing by the LSI 16 is ended.

As described above, in the exemplary embodiment, when the setting data for performing a hard wired processing on signals such as an image signal and/or the sound signal in the hardwired processing section 38 of the LSI 16 is automatically downloaded to the functional blocks 36 of the register/table memory 34, the setting data is stored in advance in the external memory 14 with association to each of the corresponding functional blocks. The external CPU 12 designates to the memory designation controller 30 one or more functional blocks 36 that are download targets of the setting data, and mask setting is performed in the memory designation controller 30 in order to set the download target block and the non-download target block which is prevented from data writing. The external CPU 12 changes the sequence of the setting data stored in the external memory 14 such that the setting data to be downloaded is stored in sequence without any space between the addresses thereof. When the download start instruction is input from the external CPU 12 to the start flag output section 22, the download start flag "1" is output as the start signal, and download is executed based on the start signal. The address controller 26 outputs to the access controller 28 a control signal while incrementing output target address in sequence by one byte from the beginning address loaded from the start address setting section 24, and the access controller 28 outputs at a determined access time a control signal to the external memory 14, as a data output instruction for causing the setting data to be output. Due to this control signal, the external memory 14 outputs the setting data to the register/table memory 34. On the other hand, the memory designation controller 30 outputs, based on the mask setting, to the write controller 32 the write address of the functional blocks 36 to which the downloaded setting data is written, and the controller 32 outputs at a determined write time a write instruction for writing the downloaded setting data to the write address of the corresponding functional block 36. When increment of the number of bytes reaches the total amount of data in the address controller 26, the data output instruction end signal is output to the start flag output section 22. The start flag output section 22 thus determines that download has been completed, resets the flag of the start flag output section 22, and outputs an end signal (end flag "0"). Automatic download is stopped based on this end signal. The hardwired processing section 38 performs hard wired processing on the signals such as the image signal and/or the sound signal based on the downloaded setting data.

In the exemplary embodiment, since the LSI 16 executes the automatic download processing, the external CPU 12 only needs to store setting data in the external memory 14, set the beginning address and the mask, change the sequence of the stored setting data, and then simply output an automatic download start instruction. Thereby, without applying processing burden to the external CPU 12, setting (download) can be made to register groups and table memory of the functional blocks 36 corresponding to the image signals and/or the sound signals which require setting of a large amount of data, and signal processing can be performed for the image signal and/or the sound signal by hard wired processing.

Consequently, the external CPU 12 can execute the main designated operations or other processing, without taking time or program execution capability for download of setting data. This enables effective system operation.

The LSI 16 of the exemplary embodiment performs output instruction and write instruction of the setting data based on the mask setting of the memory designation controller 30. Therefore, there is no downloading of setting data that is not required to be downloaded, and only the setting data that is required is output from the external memory 14 and written to the corresponding functional blocks 36. Consequently, the time for downloading can be speeded up.

In addition, in the exemplary embodiment, writing of the setting data is executed by continuously performing output instruction by the address controller 26 incrementing the address of the setting data that is sequentially stored in the external memory 14. Therefore, writing can be performed at comparatively high speed than the external CPU 12 executing writing of setting data for each of the registers and each of the memory addresses of the functional blocks 36.

The number of the functional blocks 36 and the function thereof, and the number of bytes of the setting data are simply examples thereof, and there are no particular limitations thereto, and other functions may be employed.

In addition, by pre-storing the setting data in the external memory 14, which is a non-volatile memory such as a flash memory or the like, processing for resetting the setting data in the external memory 14 can be omitted.

In the exemplary embodiment, execution of automatic download is controlled by the download start flag (start signal) that has been set in the start flag output section 22. However, the embodiments are not limited to this, and automatic download may be controlled by a control signal (flag) that has been externally input via the interface 20 or the like.

In the exemplary embodiment, the downloaded setting data is written to the functional blocks 36 of the register/table memory 34 provided internally to the LSI 16. However, embodiments are not limited to this, and the setting data may be downloaded and written to a memory provided externally. In such cases, an interface corresponding to the memory that is the writing destination may be further provided, and processing performed via this interface.

Explanation has been given in the exemplary embodiment by way of a signal processor (LSI) 16 that performs processing of image signals and/or sound signals in the hardwired processing section 38. However, embodiments are not limited to this and the processing performed in the hardwired processing section 38 may be other signal processing, or a signal processing section other than the hardwired processing section 38 may be provided, and signal processing of another signal may be performed.

The LSI 16 of the exemplary embodiment is controlled by an external CPU 12, and does not include an internal CPU. However, embodiments are not limited to this, and a CPU may be internally installed, and the LSI 16 may be controlled by the internal CPU. Such an internal CPU is enabled to execute the main designated operations or other processing during automatic download of the setting data to the functional blocks 36, since even in such cases the processing load on the internal CPU is reduced.

Second Exemplary Embodiment

Explanation will now be given of a second exemplary embodiment, with reference to the drawings.

Note that since the configuration and operation of the signal processing system and signal processor of the second exemplary embodiment are substantially the same as those of the first exemplary embodiment, explanation will only be given of the portions thereof that are different, and portions that are similar to those of the first exemplary embodiment will be allocated the same reference numerals and explanations thereof are omitted. Further, detailed explanation will be given, as in the first exemplary embodiment, of an example in which the setting data is stored in an external memory 14, the download target blocks are functional blocks 1 and 3, and the non-download target block is functional block 2.

Figure 8:
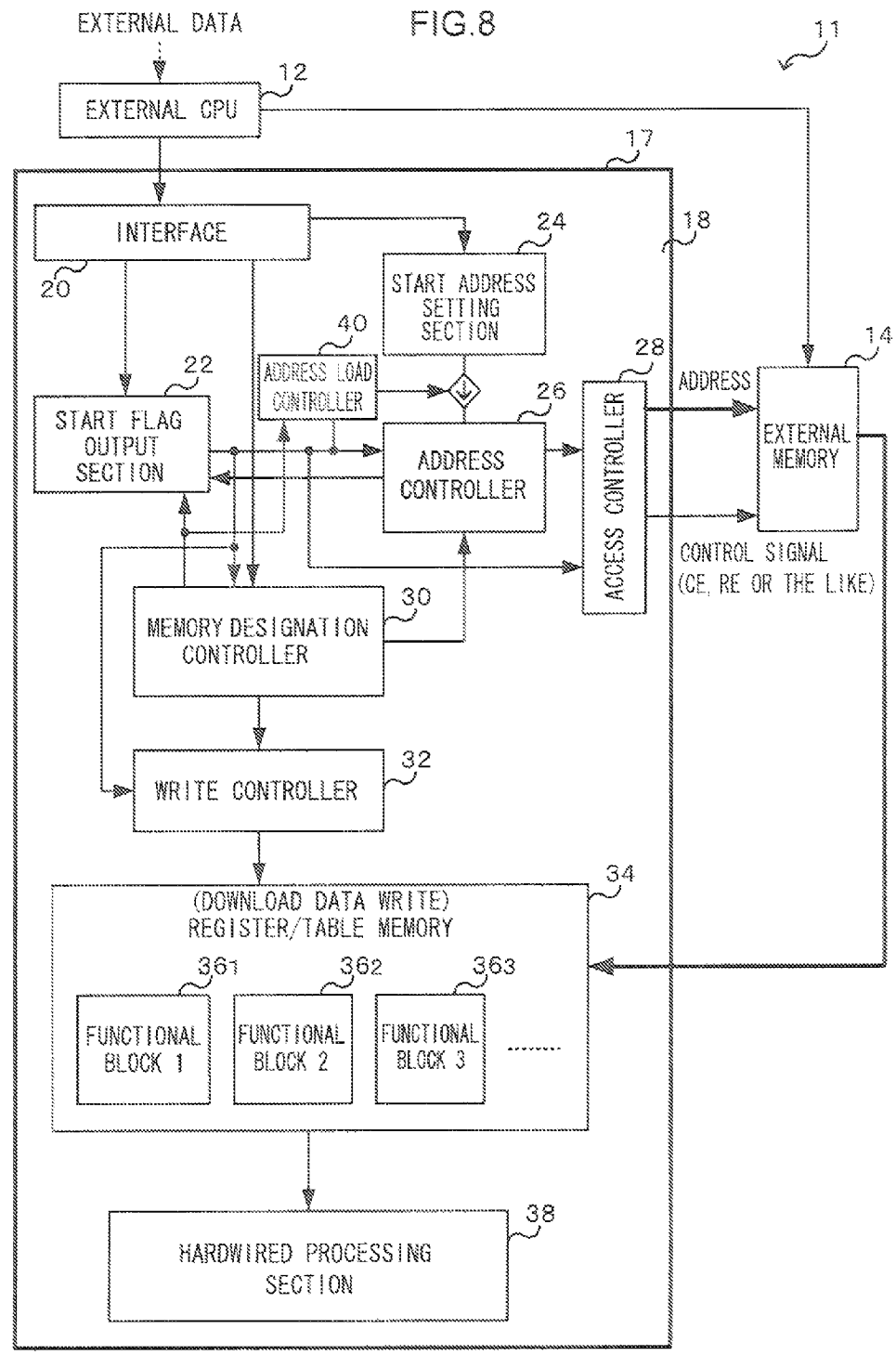
FIG. 8 is a functional block diagram showing an example of a schematic configuration of a signal processing system according to a second exemplary embodiment.

FIG. 8 shows a functional block diagram showing an example of a schematic configuration of a signal processing system of the second exemplary embodiment. An LSI 17, which is a signal processing system 11 of the second exemplary embodiment, is further provided with an address load controller 40, in addition to the configuration of the signal processing system 10 of the first exemplary embodiment. Note that the address load controller 40 in the second exemplary embodiment corresponds to a start address read-in controller.

The address load controller 40 is connected to the start flag output section 22 and to the memory designation controller 30, and controls loading of the start address to the address controller 26 from the start address setting section 24.

In the start address setting section 24, for each of the functional blocks 36, the beginning address of the setting data stored in the external memory 14 is set as the start address of each of the functional blocks 36.

The address controller 26 controls the download address of the external memory 14 for each of the download target blocks.

Detailed explanation will now be given regarding the operation of the signal processing system 11 of the second exemplary embodiment.

Figure 9:
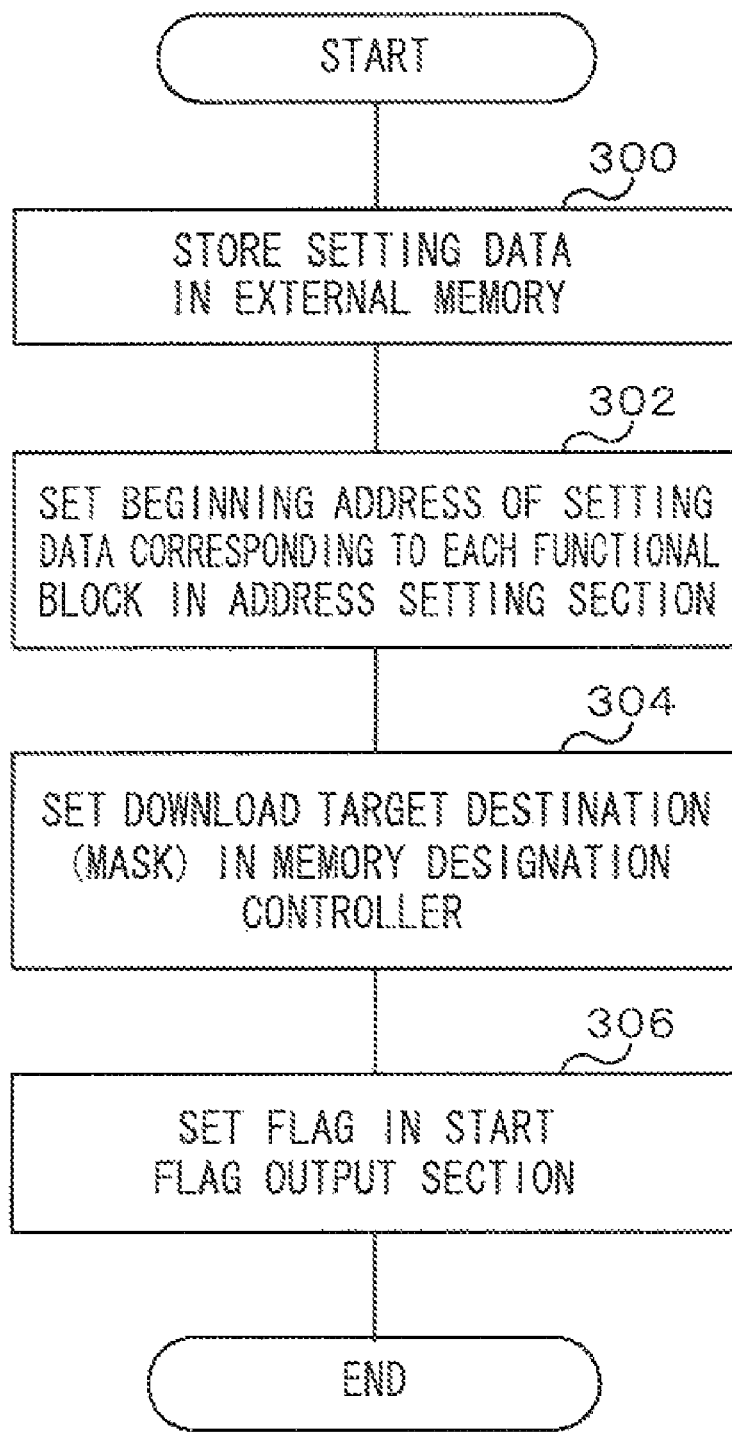
FIG. 9 is a flow chart showing an example of signal processing executed in an external CPU according to the second exemplary embodiment.

First, explanation will be given of the operation of the external CPU 12 of the second exemplary embodiment. FIG. 9 is a flow chart showing an example of signal processing executed in the external CPU 12 of the second exemplary embodiment.

At step 300, as in the first exemplary embodiment (step 100 of FIG. 2), the setting data is stored in the external memory 14.

Figure 10:
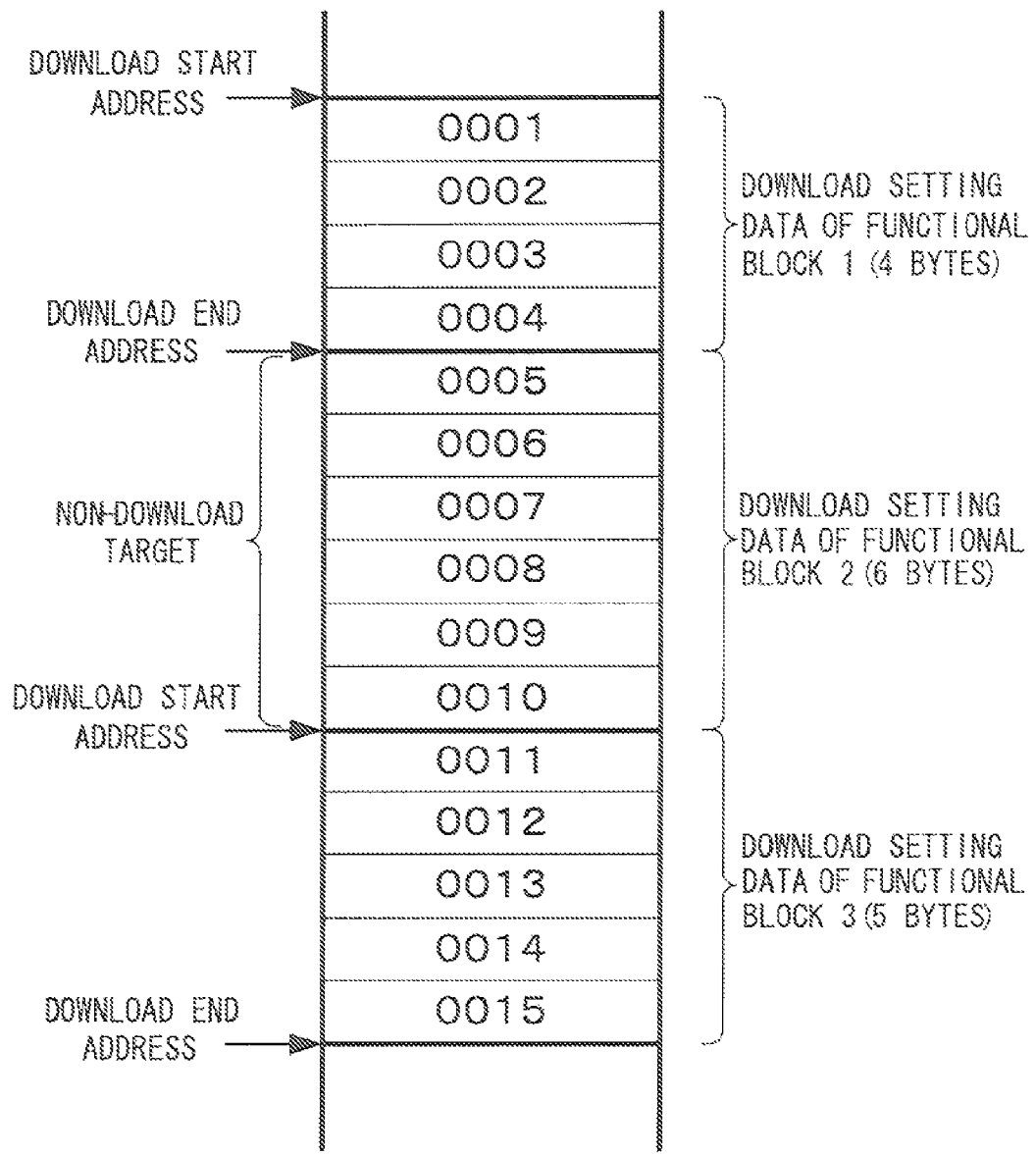
FIG. 10 is a diagram explaining a start address in setting data stored in an external memory according to the second exemplary embodiment.

In the next step 302, the beginning address of the setting data corresponding to all of the functional blocks is set as the start address for each of the functional blocks in the start address setting section 24. In the second exemplary embodiment, as in the first exemplary embodiment, since setting data as shown in FIG. 10 is stored, the address "0001" is set as the download start address for functional block 1, the address "0005" is set as the download start address for functional block 2, and the address "0011" is set as the download start address for functional block 3.

As in the first exemplary embodiment, the processing of step 300 and the processing of step 302 may be performed in advance.

At step 304, as in the first exemplary embodiment (step 104 of FIG. 2), setting is made in the memory designation controller 30 of download target blocks, and non-download target blocks (mask).

At step 306, as in the first exemplary embodiment (step 108 of FIG. 2), a start flag "1" is set in the start flag output section 22, and then the pressing routine is ended.

In this manner, in the second exemplary embodiment the sequence of the setting data of the external memory 14 is not changed according to whether the setting data is to be downloaded or not.

Figure 11:
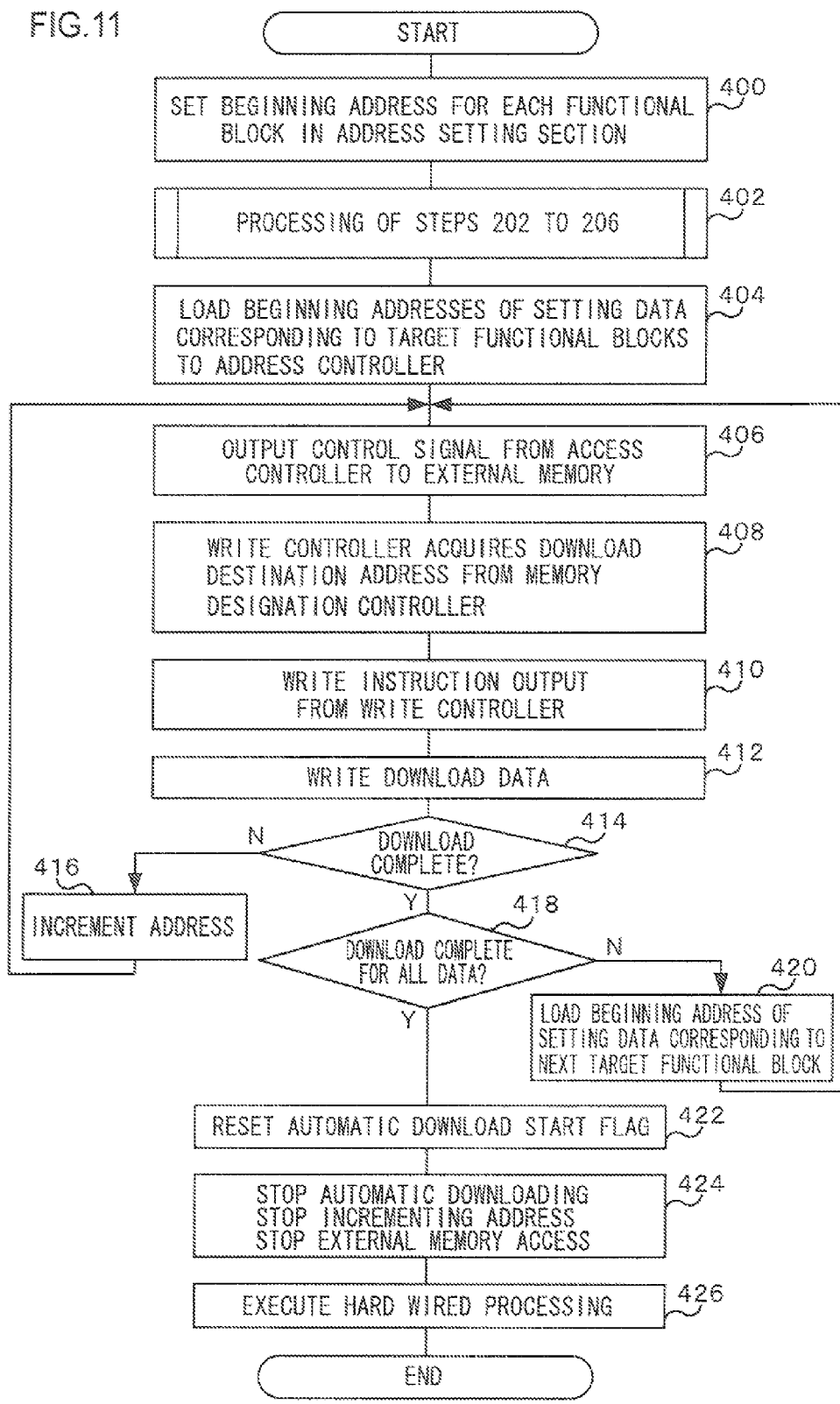
FIG. 11 is a flow chart showing an example of overall operational flow of an LSI (signal processor) according to the second exemplary embodiment.

Detailed explanation will now be given of the overall operation of the LSI 17. FIG. 11 is a flow chart showing an example of flow in the overall operation of the LSI 17 of the second exemplary embodiment.

At step 400, the start address is set in the start address setting section 24 by the external CPU 12 (processing of step 302). An example of this setting is shown in FIG. 12.

In the next step 402, a mask is set in the memory designation controller 30, as in steps 202 to 206 of the first exemplary embodiment (FIG. 5), the start flag "1" is set in the start flag output section 22, and the start flag "1" is output as a start signal from the start flag output section 22.

In step 404, the start address of the first download target block set in the start address setting section 24 is loaded, under control of the address load controller 40, to the address controller 26.

In step 406, as in the first exemplary embodiment (step 212 of FIG. 5), a control signal of a CE signal, an RE signal and the like, is output from the access controller 28, based on the address controller 26, as a data output instruction to the external memory 14.

The setting data to be downloaded from the external memory 14 is output to the register/table memory 34 based on this control signal.

In step 408, as in the first exemplary embodiment (step 214 of FIG. 5), the write controller 32 acquires a write address of the first download target block from the mask setting (FIG. 7) of the memory designation controller 30.

At step 410, as in the first exemplary embodiment (step 216 of FIG. 5), the write instruction to write the download data to the download target block is output from the write controller 32.

In step 412, as in the first exemplary embodiment (step 218 of FIG. 5), corresponding setting data is written to the specific address of the download target block.

At step 414, determination is made as to whether or not download has been completed. Determination is made here as to whether or not setting data corresponding to one download target block has been completed. Specifically, determination is made based on whether or not incrementing of the address from the start address to the complete address is complete in the address controller 26 (i.e., whether or not the control signal has been output up to the complete address). For example, when the download target block is functional block 1, determination is made that download for functional block 1 is complete when the address is incremented from the start address "0001" up to the complete address "0004". When not complete the routine proceeds to step 416, and the address is further incremented, and the routine returns to step 406, and a control signal for causing data stored at the incremented address to be output is output to the external memory 14, and write processing to the functional block corresponding to the setting data that has been output from the external memory 14 is repeated. However, when download is complete the routine proceeds to step 418.

At step 418, determination is made as to whether or not download is complete of all of the data instructed to be downloaded by the external CPU 12. Namely, determination is made as to whether or not download of the setting data for all of the instructed functional blocks has been completed. When there are functional blocks for which download has not been performed, the routine proceeds to step 420, the start address of the setting data corresponding to the next download target block is loaded to the address controller 26 under control of the address load controller 40, the routine returns to step 406, and download is repeated for the setting data corresponding to the next download target block. However, when download of the setting data corresponding to all of the download target blocks has been completed, the routine proceeds to step 422, and as in the first exemplary embodiment (step 224 of FIG. 5), a data output instruction end signal is output and the flag of the start flag output section 22 is reset. An end signal that is an end flag "0" is thereby output from the start flag output section 22.

At step 424, as in the first exemplary embodiment (step 226 of FIG. 5), automatic download is stopped based on the end signal that has been output from the start flag output section 22. The address controller 26 stops incrementing in the address when input with the end signal, the access controller 28 also stops access to the external memory 14, whereby output of the control signal that is the data output instruction is stopped.

In step 426, as in the first exemplary embodiment (step 228 of FIG. 5), signal processing by the LSI 17 ceases after hard wired processing has been executed in the hardwired processing section 38.

In the second exemplary embodiment as explained above, the beginning address of the setting data stored in the external memory 14 is set as the start address in the start address setting section 24 for each of every one of the functional blocks. The address load controller 40 controls such that the start address of the download target block is loaded, and the address controller 26 outputs, for each of the functional blocks, the control signal while incrementing the address from the loaded start address up to the complete address.

As described above, in the second exemplary embodiment, since the setting data can be output independently of the stored sequence of the setting data stored in the external memory 14, there is no need to sort the sequence of the setting data stored in the external memory 14. Consequently, processing load relating to sorting the sequence of setting data is saved.

According to the exemplary embodiments, the processing load on a CPU can be reduced, and data can be downloaded at high speed.

Following from the above description and embodiment, it should be apparent to those of ordinary skill in the art that, while the foregoing constitutes an exemplary embodiment of the present disclosure, the disclosure is not necessarily limited to this precise embodiment and that changes may be made to this embodiment without departing from the scope of the invention as defined by the claims. Additionally, it is to be understood that the invention is defined by the claims and it is not intended that any limitations or elements describing the exemplary embodiment set forth herein are to be incorporated into the interpretation of any claim element unless such limitation or element is explicitly stated. Likewise, it is to be understood that it is not necessary to meet any or all of the identified advantages or objects of the disclosure discussed herein in order to fall within the scope of any claims, since the invention is defined by the claims and since inherent and/or unforeseen advantages of the present disclosure may exist even though they may not have been explicitly discussed herein.

What is claimed is:

1. A signal processor comprising:
    a plurality of storage sections;
    a start address input section to which a start address is input from an external controller, the start address indicating an address for starting output of data from an external memory that stores a set of data to be downloaded to the plurality of storage sections;
    a signal output section adapted to output a start signal based on a download start instruction input from the external controller, and to output an end signal when download has been completed of data to be downloaded to at least one storage section designated by the external controller;
    an output instruction section that: (A) when the start signal is input thereto, is adapted to output to the external memory a data output instruction to output data corresponding to bytes of the data to be downloaded to the at least one designated storage section, starting from the start address, and (B) when the end signal is input thereto, is adapted to stop output of the data output instruction; and
    a write instruction section that is adapted to receive input of the at least one designated storage section from the external controller, and, based upon the input, output a write instruction to the plurality of storage sections which prohibits writing of data to the plurality of storage sections other than the at least one designated storage section, and causes the data to be downloaded to be written only to the at least one designated storage section when the start signal is input to the output instruction section.

2. The signal processor of claim 1, wherein the start address input section, the signal output section, the output instruction section and the write instruction section are formed on an integrated circuit board.

3. The signal processor of claim 1, wherein the output instruction section is adapted to output to the signal output section a data output instruction end signal indicating that the data output instruction, related to the bytes of the data to be downloaded to the at least one designated storage section, has been output from the external memory, and wherein the signal output section is adapted to output the end signal based on the data output instruction end signal.

4. The signal processor of claim 1, wherein the external controller changes a sequence of the data stored in the external memory, in a sequence in which the data to be downloaded to the at least one designated storage section is serially stored starting from the start address, and wherein the data output instruction output by the output instruction section indicates that the external memory is to output, starting from the start address, a total number of bytes of data to be downloaded to the at least one designated storage section.

5. The signal processor of claim 1, wherein the start address input section is adapted to receive each respective start address of the set of data stored in the external memory;
    wherein the signal processor further comprises a start address read-in controller that controls the output instruction section, such that each respective start address for the data to be downloaded to each respective designated storage section is read-in to the output instruction section from the start address input section; and
    wherein the data output instruction output by the output instruction section indicates that the external memory is to output, in units of bytes, data to be downloaded to each respective designated storage section, starting from the start address of the data.

6. A signal processing system comprising:
    a signal processor comprising:
        (a) a plurality of storage sections,
        (b) a start address input section to which a start address is input from a controller, the start address indicating an address for starting output of data from a memory that stores a set of data to be downloaded to the plurality of storage sections, (c) a signal output section adapted to output a start signal based on a download start instruction input from the controller, and to output an end signal when download has been completed of data to be downloaded to at least one storage section designated by the controller, (d) an output instruction section that: (A) when the start signal is input thereto, is adapted to output to the memory a data output instruction to output data corresponding to bytes of the data to be downloaded to the at least one designated storage section, starting from the start address, and (B) when the end signal is input thereto, is adapted to stop output of the data output instruction, and (e) a write instruction section that is adapted to receive input of the at least one designated storage section from the external controller; and, based upon the input, output a write instruction to the plurality of storage sections which prohibits writing of data to the plurality of storage sections other than the at least one designated storage section, and causes the data to be downloaded to be written only to the at least one designated storage section when the start signal is input to the output instruction section;

the memory that stores the act of data to be downloaded to the plurality of storage sections; and, the controller adapted to output the start address that indicates where to start output of data stored in the memory, a designation of at least one storage section that is a download destination of the data, and a download start instruction;

wherein the signal processor is adapted to write the data stored in the memory to the at least one designated storage section, based on the start address, the designation of the at least one storage section, and the download start Instruction, which are output by the controller.

* * * * *